G. R. HOLMES AND W. J. WISCH.
NUT LOCK.
APPLICATION FILED MAY 8, 1920.

1,378,116.

Patented May 17, 1921.

Inventors
G. R. Holmes
W. J. Wisch

By
J. T. Dowling.
Attorney

UNITED STATES PATENT OFFICE.

GWYLLYM R. HOLMES AND WALTER J. WISCH, OF BALTIMORE, MARYLAND, ASSIGNORS TO THE BULL DOG LOCK WASHER CO., OF BALTIMORE, MARYLAND, A CORPORATION OF MARYLAND.

NUT-LOCK.

1,378,116.  Specification of Letters Patent.  Patented May 17, 1921.

Application filed May 8, 1920. Serial No. 379,795.

*To all whom it may concern:*

Be it known that we, (1) GWYLLYM R. HOLMES and (2) WALTER J. WISCH, citizens of the United States of America, residing at Baltimore, in the State of Maryland, have invented certain new and useful Improvements in Nut-Locks, of which the following is a specification.

This invention relates to certain new and useful improvements in nut locks and has particular reference to an improved form of washer adapted for reception upon a bolt and constructed so as to effectively prevent turning of a nut off of said bolt.

The present invention is specifically designed as an improvement over the form of washer shown, described and claimed in the patent to Harry G. Norwood, No. 1,319,894, dated October 28, 1919, of which we are parties in interest.

The primary object of the present invention is to provide an improved washer for readily and more effectively locking nuts against turning off of bolts, the washer being so constructed as to render unnecessary any modification of the nut or bolt, such as the provision of grooves or the like, incident to its use.

A further object of the invention is to provide a washer adapted to be loosely placed upon the shank of a bolt concentric with the latter and having an inwardly projecting spur, the washer being provided also with nut engaging tongues adapted to be engaged by the nut when the latter tends to turn off of the bolt for causing the washer to be moved to a position eccentric of the bolt so as to cause the spur to dig into the threads of the bolt and thereby prevent such turning of the nut off of the bolt.

With the above general objects in view and others that will appear as the nature of the invention is better understood, the same consists in the novel form, combination and arrangement of parts hereinafter more fully described, shown in the accompanying drawing and claimed.

Figure 1:
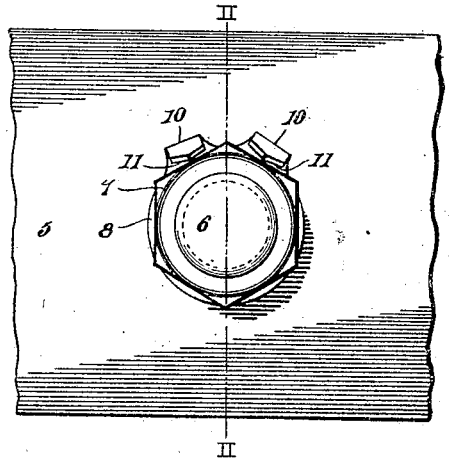
Figure 2:
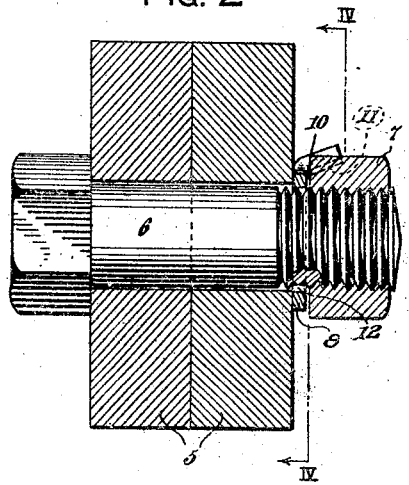
Figure 3:
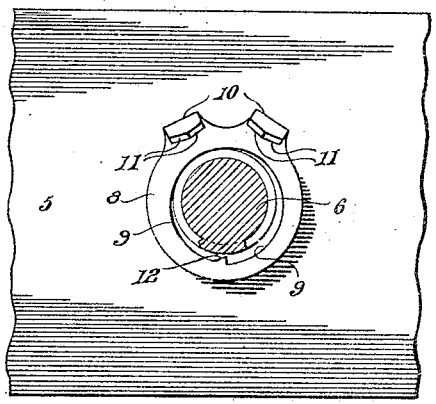
Figure 4:
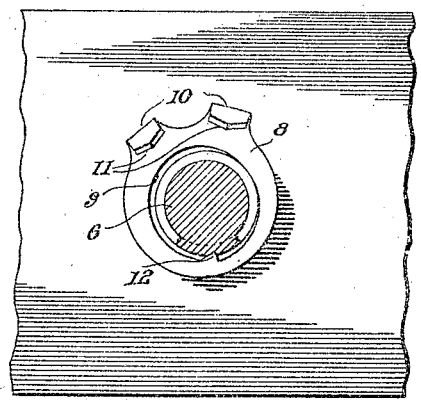
Figure 5:
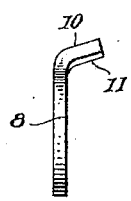

In the drawing, wherein like reference characters designate corresponding parts throughout the several views, Figure 1 is an end elevational view of a bolt having a nut and our improved washer operatively disposed thereon and illustrated in connection with parts being bolted together, Fig. 2 is a sectional view taken substantially upon line II—II of Fig. 1, Figs. 3 and 4 are views taken substantially upon line IV—IV of Fig. 2, the washer being in its initial or ineffective position in Fig. 3 and in its locking position in Fig. 4, and Fig. 5 is an edge elevational view of the locking washer removed.

Referring to the drawing in detail, 5 indicates a pair of members which are bolted together by means of the bolt 6 and nut 7, said nut being threaded upon the screw threaded end of the bolt 6 after our improved locking washer 8 has been placed thereon as shown in Fig. 3.

The locking washer 8 comprises a thin body of metal having an eccentric aperture or opening 9 of slightly larger diameter than the diameter of the shank of the bolt 6, so that said washer may be readily slid onto the bolt to engage the adjacent side face of the adjacent bolted member 5. Extending laterally at an obtuse angle to the body of the washer 8 are a pair of spaced rigid tongues 10 whose inner faces are of angular formation as at 11. As shown clearly in Figs. 3 and 4, the washer 8 is provided with an inwardly projecting spur 12 which is arranged to extend inwardly in a tangential direction.

In the use of the present invention, the bolt 6 is inserted through the members 5, and the washer 8 is slid onto the bolt 6 into the position shown in Fig. 3 wherein the washer is concentric with the shank of the bolt 6 and the spur 12 is slightly spaced from said shank. The nut 7 is threaded upon the bolt 6 until the same assumes the position of Figs. 1 and 2 with the washer still substantially positioned as shown in Fig. 3, the angular formation of the inner faces of the tongues 10 permitting the corner of the nut 7 to assume the position shown in Fig. 1 between the pair of tongues 10. In other words, the corner of the nut may be forced past one of the tongues 10, after which the washer and nut rotate together for tightly clamping the members 5 together. If reverse rotation should be imparted to the nut 7 accidentally or otherwise, the adjacent corners of the nut will engage the tongues 10 at the right and left and thereby force the washer to the position of Fig. 4 wherein the washer is in a position eccentric of the bolt shank. This movement of the washer causes the spur 12 to dig into the threads of the bolt so as to prevent the rotation of the nut off of the bolt as will be apparent. It will thus be seen that the present washer is substantially ineffective until the reverse rotation of the nut occurs.

In practice, the present washer has been found to more effectively prevent rotation of nuts off of bolts than prior similar devices, even when the nuts are subjected to extremely severe vibration, and the present invention is extremely practical because of the fact that no costly modification of standard bolts and nuts is necessary to its use and operation. It will of course be understood that the bolt 6 is prevented from turning in any usual or desired manner.

It is believed that the construction and operation of the present invention as well as the advantages thereof will be readily understood and appreciated by those skilled in the art.

Minor changes may be made without departing from the spirit and scope of the invention as claimed.

What we claim as new is:—

In combination with a member having a bolt extending therethrough with a nut threaded thereon, a washer loosely arranged upon the bolt between the member and the nut and provided with an inwardly projecting rigid spur, and a rigid tongue on the washer engageable by the nut to prevent turning of the latter relative to the washer, said tongue and said spur being formed and arranged to permit free turning of the nut onto the bolt, and said tongue being arranged to be engaged by the nut when the latter tends to turn off of the bolt for sliding the washer transversely of the bolt and causing digging of the spur into the threads of the bolt, whereby such turning of the nut off of the bolt is prevented.

In testimony whereof we affix our signatures.

GWYLLYM R. HOLMES.
WALTER J. WISCH.